United States Patent [19]
Huykman

[11] Patent Number: 5,394,076
[45] Date of Patent: Feb. 28, 1995

[54] PULSE WIDTH MODULATED POWER SUPPLY OPERATIVE OVER AN EXTENDED INPUT POWER RANGE WITHOUT OUTPUT POWER DROPOUT

[75] Inventor: Richard B. Huykman, Montville, N.J.

[73] Assignee: AlliedSignal Inc., Morris Township, Morris County, N.J.

[21] Appl. No.: 111,674

[22] Filed: Aug. 25, 1993

[51] Int. Cl.$^6$ .............................................. G05F 1/613
[52] U.S. Cl. .................................... 323/222; 323/224; 323/226; 323/273; 323/303; 323/901
[58] Field of Search .......................... 323/270, 273–279, 323/222, 224, 225, 226, 303, 901

[56] References Cited

U.S. PATENT DOCUMENTS

| | | | |
|---|---|---|---|
| 4,626,766 | 12/1986 | Musil | 323/222 |
| 4,677,367 | 6/1987 | Goodman | 323/222 |
| 5,216,353 | 6/1993 | Mori | 323/224 X |

*Primary Examiner*—Kristine L. Peckman
*Assistant Examiner*—Y. Jessica Han
*Attorney, Agent, or Firm*—Donald B. Paschburg; Howard G. Massung

[57] ABSTRACT

A pulse width modulated (PWM) power supply combines the advantages of pulse width modulator circuitry with linear circuitry to provide power supply operation over an extended input range with no dropout of power supply output and no adverse effect on a load. The PWM circuitry includes input voltage scalers, control logic, mode detectors, an inductor, a diode switch and a capacitor and the linear circuitry includes a transistor, transistor voltage scaling and gate driver logic.

10 Claims, 2 Drawing Sheets

PULSE WIDTH MODULATED POWER SUPPLY OPERATIVE OVER AN EXTENDED INPUT POWER RANGE WITHOUT OUTPUT POWER DROPOUT

BACKGROUND OF THE INVENTION

1. Field of the Invention

The present invention relates to power supplies and more particularly to power supplies capable of operating while receiving a wide range of input power such as occurs in vehicular battery supplies.

2. Description of the Prior Art

A battery operating in a mobile vehicular application described by MIL-STD-461C for line voltage experiences severe transients during vehicle operation. A conventional Pulse-Width-Modulated (PWM) voltage regulator which controls the output voltage to a defined set point can typically tolerate input variations over a range of input voltages where the maximum to the minimum ratio is about 3.5. This voltage range on the input corresponds to a duty cycle for the PWM regulator from about 15% to 85% which is near the current optimum design parameters for many PWM power supplies.

In prior art power supplies the PWM operation was designed for the operating levels of FIG. 2 describing the high and low transient voltage levels. The design was optimized around the normal steady state (26 VDC) and achieved high efficiency without shutting OFF when operating between the high level (42 VDC) and the low level (12 VDC) transient boundaries of voltage. The power supply operation was disabled outside this locus of operating points, causing a loss of operating power to the system.

SUMMARY OF THE INVENTION

This design consists of a combination of two designs into one composite design which allows operation over an extended input range from a battery supply as defined by MIL-STD-461C. The input range can vary between 12 VDC and 100 VDC without experiencing any loss of power output.

The two circuit designs include pulse width modulator (PWM) circuitry comprising input voltage scalers, control logic, mode detectors, an inductor, a diode switch and a capacitor with linear circuitry comprising a transistor, transistor voltage scaling and gate driver logic.

Because the extreme transients are of short duration, rather than designing the PWM to operate into the extreme transient range, the linear voltage regulator is used to control the output voltage during the high level voltage transients defined in FIG. 3. The power processing semiconductors are the same as with a PWM design. The transistor which previously operated only to turn the supply ON or OFF is now operated in a linear mode whenever the high level transient is exceeded.

DETAILED DESCRIPTION OF THE INVENTION

Figure 1:
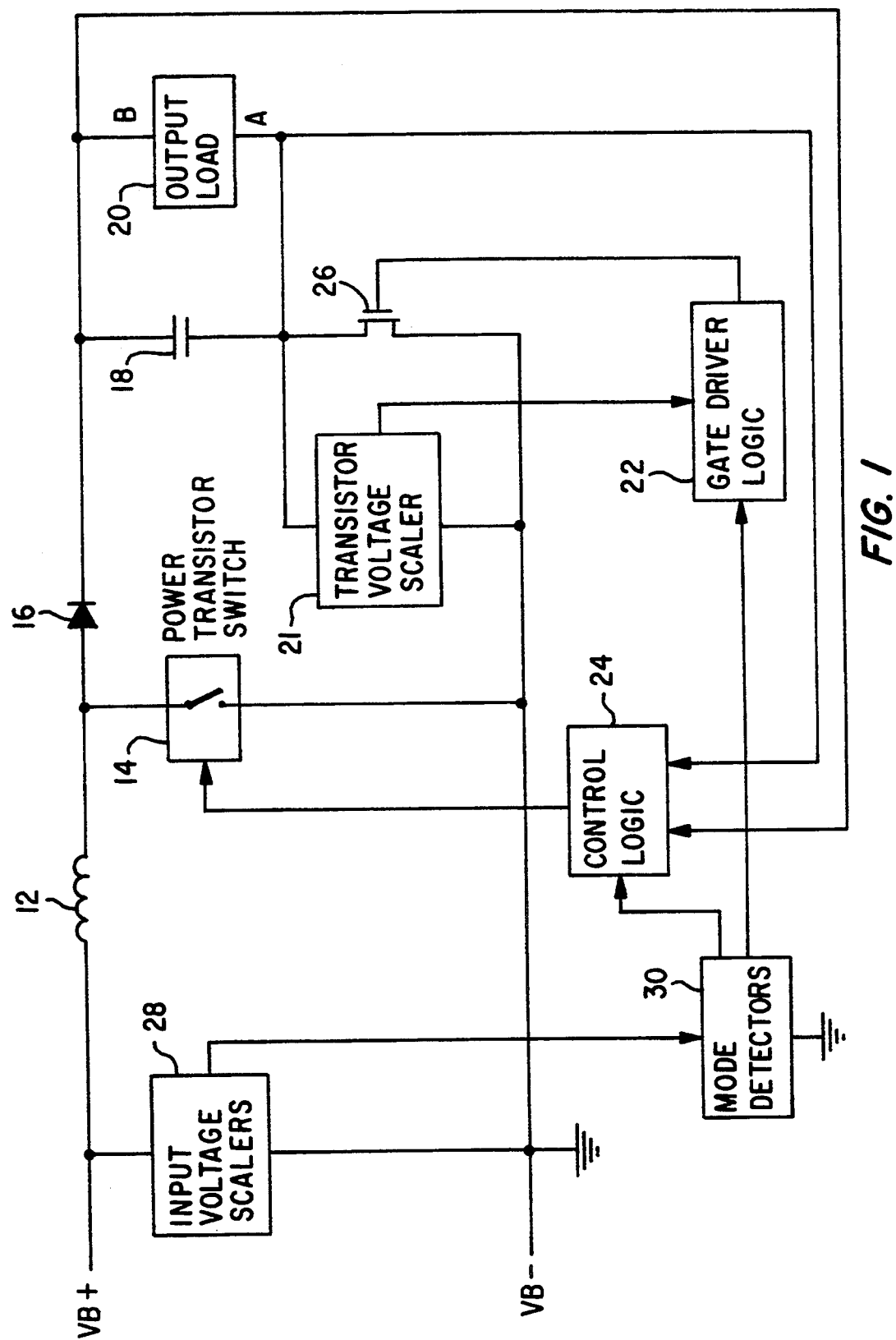
FIG. 1 illustrates a block diagram of one embodiment of the present invention.

The PWM power components are inductor 12, power transistor switch 14, diode 16, and capacitor 18 across which the output load 20 is connected. Control logic 24 monitors points A and B to regulate the output voltage at load 20 and switches switch 14 using a PWM control circuit. Transistor 26 operates as a saturated switch over the normal input range of voltages. In a particular instance, for example, a normal extreme of battery input voltage is from 12 VDC to 42 VDC which provides an operating range ratio of about 3.5 of maximum input to minimum input range voltage. When the input battery voltage exceeds the normal range of upper level voltage (approx. 42 VDC in a particular instance), then transistor 26 acts as a linear regulator whose voltage drop is regulated by the input battery voltage and controlled to a proper logic level by transistor voltage scaler 21.

The input voltage scalers 28 provide a regulated logic voltage of +10 VDC to the control logic contained in mode detectors 30, control logic 24, and gate driver logic 22. Additionally, the input voltage scalers supply a low level control voltage which is proportional to the input voltage between VB+ and VB−. This proportional control voltage is used by the mode detectors 30 to determine the set point at which transistor 26 changes from saturated operation to linear operation.

Figure 2:
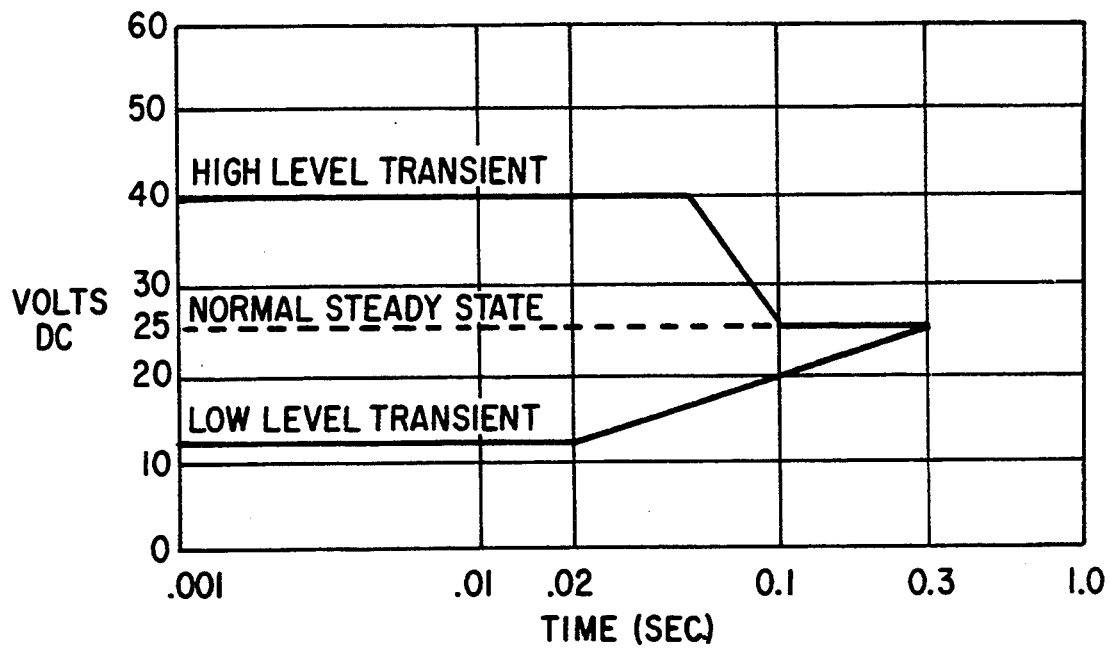
FIG. 2 illustrates the nominal transient voltage levels of MIL-STD-461C.
Figure 3:
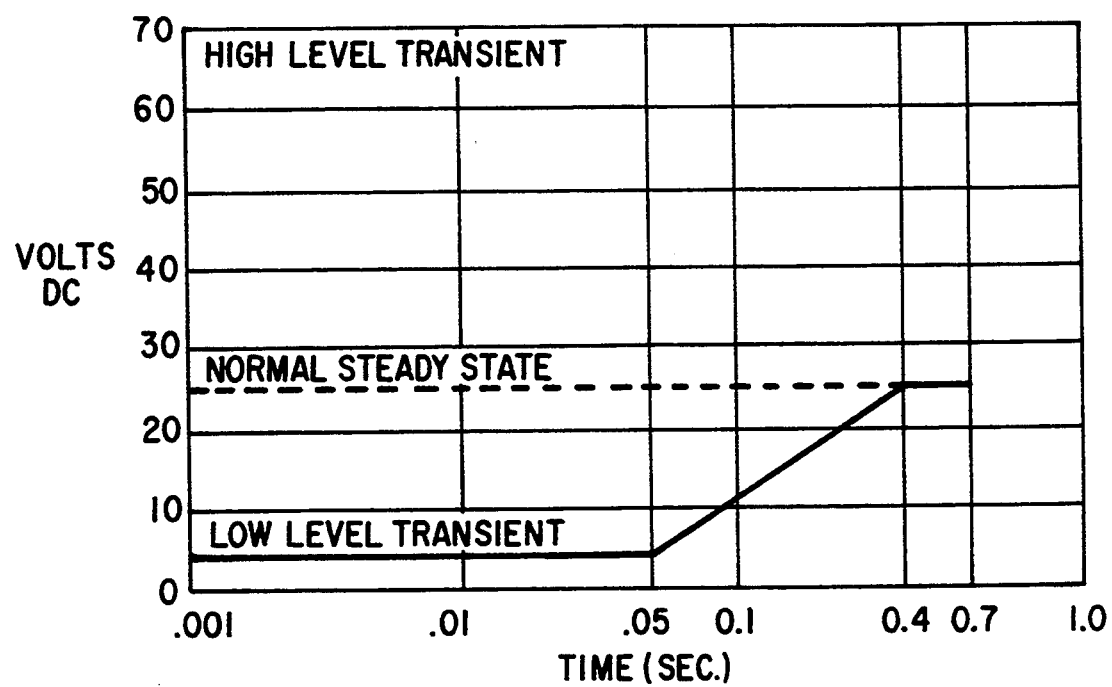
FIG. 3 illustrates the severe transient voltages experienced by battery powered mobile equipment according to MIL-STD-461C.

For most vehicle battery supply applications utilized in military applications according to MIL-STD-461C, the transient voltage levels are described by FIGS. 2 and 3. The typical PWM supplies cease processing power when the input battery voltage rises above 40 to 45 VDC and the supplies resume operation when the voltage once again drops into the normal operating range below the 40 to 45 VDC set point.

A particular example of the operation of the composite voltage regulator from a military battery supply input at a nominal 26 VDC between VB+ and VB− has the load 20 held to a set voltage of 48 VDC. When the input voltage increases to be between the set point of 42 VDC up to 54 VDC, transistor 26 operates in a linear mode such that the load 20 voltage, which is maintained at 48 VDC, plus the drop across transistor 26 equals the input voltage plus 8 VDC. This assures continued operation of the PWM boost regulator within its design parameters over this increase of input voltage. At a second set point where the input voltage increases above 54 VDC, the PWM transistor switch 14 remains open all the time, and the load 20 voltage and capacitor 18 is controlled to be 48 VDC solely by the linear regulation of transistor 26.

Transistor 26 must be selected such that its safe operating region satisfies the following parameters over the operating temperature of the power supply. The occasional 100 VDC input transient last for 100 msec or less. Thus, transistor 26 must be selected to handle the full rated load current at a voltage of 52 VDC maximum (100 VDC input maximum minus 48 VDC across capacitor 18) for a maximum period of time of 100 msec.

Since the transients above 40 VDC are of short duration and infrequent, the inefficiency for this linear dissipative mode is not of consequence in terms of overall efficiency for normal operation. This implementation is cost-effective in terms of alternative filtering. The largest benefit is that there is no dropout of the power supply output voltage throughout the full high level transient range of MIL-STD-461C and there is no adverse effect on the load circuitry or the system which it controls.

When the composite voltage regulator is first powered ON, transistor 26 is used to provide a soft start circuit which controls inrush current. By ramping transistor 26 ON slowly with transistor switch 14 OFF, capacitor 18 is slowly charged up to the battery input voltage (VB+-VB−), thus controlling the inrush current. This start-up operating state is detected by the mode detector 30. This combination of linear and switch-mode technology allows for a voltage regulator which is efficient over its nominal operating range as defined by FIG. 2 of high and low line transient input voltages and which provides continued operation during extreme high voltage transients as described by FIG. 3.

It is not intended that this invention be limited to the hardware arrangement, or operational procedures shown disclosed. This invention includes all of the alterations and variations thereto as encompassed within the scope of the claims as follows.

I claim:

1. A pulse width modulated power supply, comprising:
   circuit means including inductor means connected to an input voltage, diode means connected to the inductor means, and capacitor means connected to the diode means and to a load, said circuit means providing an output voltage across the load;
   control logic means connected across the load;
   switching means connected between the inductor means and the diode means and connected to the control logic means, and controlled by said control logic means;
   input voltage scaling means;
   mode detector means connected to the input voltage scaling means and to the control logic means and responsive to an input from the input voltage scaling means for applying an output to the control logic means for controlling said control logic means;
   transistor means connected to the capacitor means;
   transistor voltage scaling means connected across the transistor means;
   gate driver logic means connected to the mode detector means, the transistor voltage scaling means and the transistor means and responsive to an other output from the mode detector means and an output from the transistor voltage scaling means for controlling said transistor means; and
   the output voltage across the load being provided without a dropout of the input voltage and without an adverse effect on said load.

2. A pulse width modulated power supply as claimed in claim 1 wherein:
   said control logic means monitors said load and comprises a pulse width modulated control circuit for switching said switching.

3. A pulse width modulated power supply as claimed in claim 1 wherein:
   said transistor means operates as a saturated switch over a normal range of said input voltage.

4. A pulse width modulated power supply as claimed in claim 3 wherein:
   said transistor means operates as a linear voltage regulator whose voltage drop is regulated by said input voltage when said input voltage exceeds a normal range.

5. A pulse width modulated power supply as claimed in claim 1 wherein:
   said input voltage scaler means provides a regulated logic voltage to said mode detector means.

6. A pulse width modulated power supply as claimed in claim 1 wherein:
   said input voltage scaler means provides a low level control voltage proportional to said input voltage to said mode detector means.

7. A pulse width modulated power supply as claimed in claim 6 wherein:
   said mode detector means uses said low level control voltage received from said input voltage scaling means to determine a set point at which said transistor means changes from saturated operation to linear operation.

8. A pulse width modulated power supply as claimed in claim 1 wherein:
   said transistor means is capable of handling full rated load current at a voltage of 52 VDC maximum for a maximum period of 100 msec.

9. A pulse width modulated power supply as claimed in claim 1 wherein:
   said transistor means provides a soft start circuit which controls inrush current.

10. A pulse width modulated power supply as claimed in claim 1 wherein:
    said transistor voltage scaling means controls voltage across said transistor means to a proper logic level.

* * * * *